United States Patent [19]
Cournoyer

[11] 3,968,722
[45] July 13, 1976

[54] MUSICAL KEYS AND INTERVALS TEACHING DEVICE

[76] Inventor: Georges A. Cournoyer, 480 Chapman St., St. Bruno, Quebec, Canada

[22] Filed: Dec. 9, 1974

[21] Appl. No.: 531,196

[52] U.S. Cl. .................................................. 84/473
[51] Int. Cl.² ......................................... G09B 15/02
[58] Field of Search ............. 84/470, 471, 473, 474

[56] References Cited
UNITED STATES PATENTS

| | | | |
|---|---|---|---|
| 2,193,885 | 3/1940 | Riley | 84/471 |
| 3,592,099 | 7/1971 | Gibby | 84/73 |

*Primary Examiner*—John Gonzales

[57] ABSTRACT

A device having the general form of a simple slide rule and bearing marking on adjacent faces to teach the law of the major mode, to effect transposition from one key to another, to readily define the signature of any selected key, and to teach the intervals, their qualifications and their relationship. This device is characterized by markings adapted to perform the above functions and including a diatonic scale including the associated degrees and tetachords of the major mode, a chromatic scale on a slide running laterally adjacent to the diatonic scale, and an intervals indicator arranged adjacent the opposite side of the chromatic scale relative to the diatonic scale and having coded marks pointing toward the chromatic scale and adapted to indicate any simple and composed interval and the qualification thereof. The marking of the tetrachords and the degrees thereof allows to readily read the signature of any key merely upon registry of the key note with the first degree.

6 Claims, 6 Drawing Figures

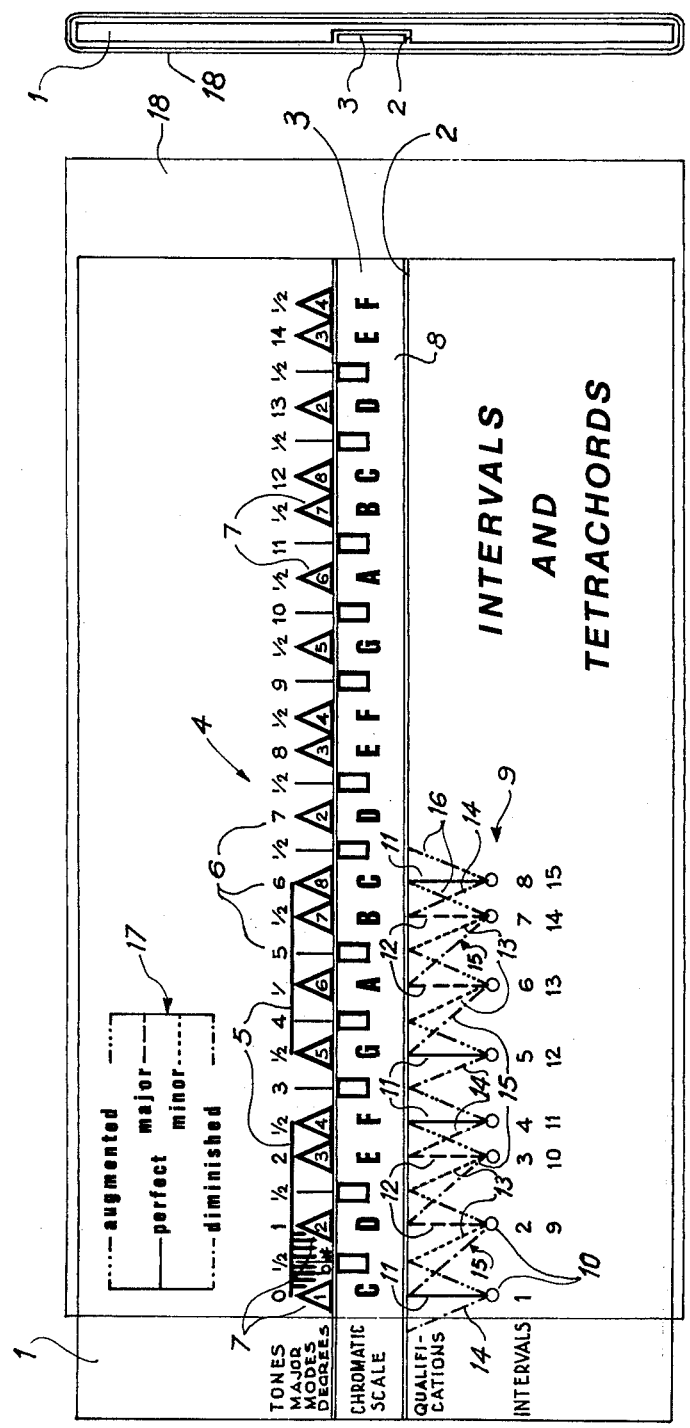

MUSICAL KEYS AND INTERVALS TEACHING DEVICE

This invention relates to the teaching of music and, more particularly, to a device of the type adapted to teach the intervals and the musical keys.

Teaching must here be interpreted in its broadest sense to cover the conventional teaching action by a teacher as well as the direct transfer of knowledge by the device itself.

So far, there have been proposed many devices adapted to teach the musical keys and the chords which may be used by the musicians. These prior art devices have been produced with the apparent object to effect practical, as compared to theoretical, teaching and indications of musical data such as to be used as aids or tools by the composers and the musicians. In the most pertinent case, there has been anteriorly proposed a device of the above type, wherein particular intervals are individually marked to be readily read on an adjacent chromatic scale. With this latter device, one can readily read an interval but the theoretical relationship between the intervals and their qualifications are not indicated and cannot be explained therewith. Another limitation of this most pertinent anterior device is that it overlooks the full benefits of the laws of the major and minor modes or tonalities. Consequently, the device has been made unnecessarily complex such as, for instance, to transpose from one key to another and to determine the signature of any particular key.

It is a general object of the present invention to provide a device of the above type which is particularly adapted to effect theoretical teaching of musical data and which is of simple construction and easy to read.

It is another general object of the present invention to provide a device of the above type which may be used as well to effect theoretical teaching of musical data to students and to effect practical works, such as of transposition, by musicians, composers, etc.

It is a more specific object of the present invention to provide a device of the above type which is particularly adapted to teach the intervals, their relationship and their qualifications, the law of the major mode and the use of the degrees of the tetrachords to transpose from one key to another and to readily determine the signature of any key.

The above and other objects and advantages of the present invention will be better understood in the light of the following detailed description of a preferred embodiment thereof, which is illustrated, by way of example, in the accompanying drawings, wherein:

FIG. 1 is a plan view of a musical keys and intervals teaching device according to the present invention;

FIG. 2 is an end view of the device of FIG. 1 as seen from the right in the latter;

Figure 5:
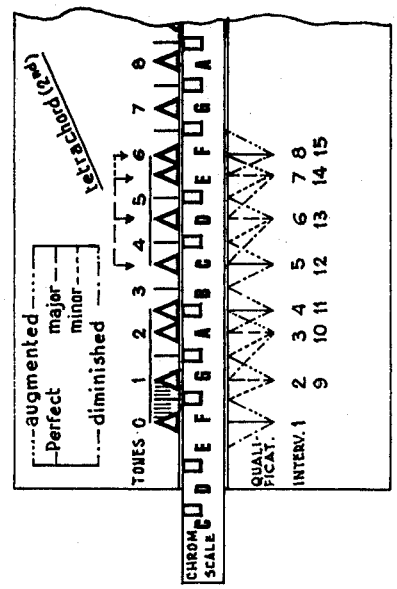

FIG. 5 similarly illustrates the registry of the note G with the zero; and

Figure 6:
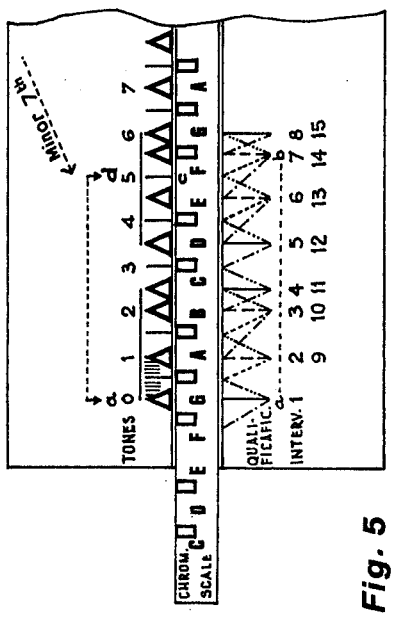

FIG. 6 illustrates the determination of the diminished fourth descending from D.

The illustrated musical keys and intervals teaching device includes a base member 1 constituted of a plate having a rectilinear groove 2 therein. A ruler 3 is slidably mounted in the groove 2 for endwise displacement therein.

The front face of the base member 1 has the diatonic scale 4 of the major mode marked along one edge of the groove 2. A pair of connecting lines 5 identify the tetrachords of the first octave and the tones are identified by a line of tone members 6. The degree of the diatonic scale 4 are indicated by the triangular degree marks 7. It must be noted that the tones and the degree marks are arranged in equidistant tonal relationship, such as 2 tones per inch.

A conventional keyboard 8, such as a piano keyboard, with the white and black keys is marked on the ruler 2 with the same equidistant tonal relationship as the laterally adjacent diatonic scale. The notes are marked on the chromatic scale for rapid identification.

An intervals indicator 9 is provided on the front face of the base member laterally adjacent to the ruler 3 bearing the chromatic scale. A series of eight points 10 are arranged along the adjacent edge of the groove 2 in transverse alignment with the triangular degree marks 7 on the diatonic scale. A first set of lines 11 lead toward the generator tones, at the degrees 1, 4, 5, and 8, the notes C, F, G, and C' for the key C, and are color coded to distinctively indicate the perfect intervals when the latter end in registry therewith. A second set of lines 12 lead toward the harmonic tones at the degrees 2, 3, 6, and 7, the notes D, E, A, and B for the key of C, and are also color coded to distinctively indicate the major intervals when the latter end in registry therewith. A third set of lines 13 lead from the points 10 of said second set of lines toward the chromatic scale a half-chromatic tone and descending interval relative to the second set of lines 12 respectively. A fourth set of lines 14 lead from the points 10 of the first set of lines 11 toward the chromatic scale a half-chromatic tone and descending interval relative to the lines 11 respectively. A fifth set of lines 15 lead from all but the first point 10 of the second set of lines 12 a full chromatic tone and descending interval relative to the corresponding lines 12. A sixth set of lines 16 lead from the points 10 of the first and second sets of lines toward the chromatic scale a half-chromatic tone and ascending interval relative to the lines 11 and 12 respectively.

The color code for the set of lines 11 to 16 inclusive is marked at 17 on the base member 1 and is defined by a line of a distinctive color in alignment with the name of each possible qualification.

The construction of the diatonic scale in the major mode may be easily explained using the tetrachords 5 and the corresponding 8 degrees identified by the triangular degree marks 7.

In order to define the notes of any octave of a selected key, the key note of the desired key is placed in transverse registry with the first degree or zero of the tone numbers. For instance, as shown in FIG. 1, the key of C is obtained by placing the ruler 3 such that the note C is transversely aligned with the first degree or zero of the tone numbers. The notes of this key of C are found in alignment with the eight degrees of the two tetrachords and, as is well known, include the notes C, D, E, F, G, A, B, and C'.

Figure 3:
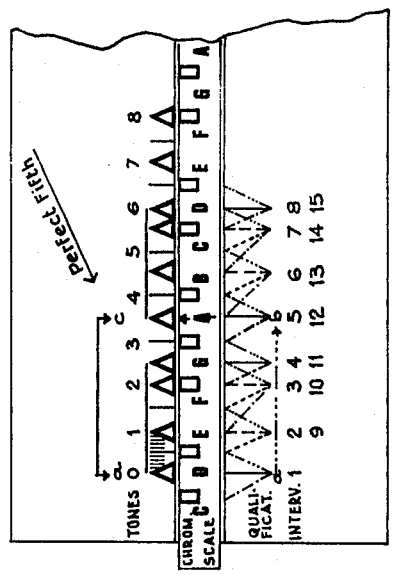
FIG. 3 is a partial view of FIG. 2 with the ruler slid to the left for registry of the note F with the zero of the tone numbers and the first degree of the diatonic scale.

The key of F, for instance, is obtained, as shown in FIG. 3, by aligning the F with the first degree of the diatonic scale. The notes in this key are simply read in registry with the 8 degrees of the two tetrachords and are F, G, A, B flat, C, D, E, and F'. Similarly, the key of G would include the notes G, A, B, C, D, E, F sharp, and G'.

The intervals indicator 9 allows to define any interval of any qualification. The major second, two adjoining notes spaced one tone apart, may be read by placing the fundamental note in alignment with the interval number 1 and by reading the other note in transverse registry with the interval number 2. For instance, the major second of C is the interval of C to D.

The minor second is an interval of two adjoining notes spaced a half-tone apart and is found by placing the first note of the interval in alignment with the interval number 1, taking the interval number 2 and following the corresponding line 13 to subtract one-half tone. Thus, the two notes E and F being adjoining and a half-tone apart, they form a minor second interval.

Consequently, in the diatonic scale of the major mode and the key of C, there are 5 major seconds from C to D, D to E, F to G, G to A, and A to B, and there are two minor seconds from E to F and B to C'.

Figure 4:
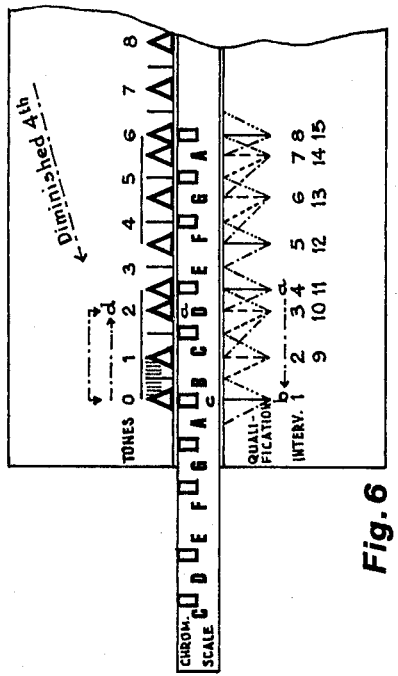
FIG. 4 is similar to FIG. 3, except for the ruler which is positioned with the note D in registry with the zero.

The interval indicator 9 may be used to define any interval. For instance, as shown in FIG. 4, the perfect fifth of D to A is defined (a) by placing the first note D to the starting point zero of the tone numbers or the first degree of the diatonic scale and reading in the line of intervals the number 1 under this first note; (b) by counting the number of adjoining notes from the note D to the note A inclusive and reading the answer 5 in the line of intervals, five adjoining notes forming the fifth; and (c) by passing from the number 5 on the corresponding line 11 to the note A. In lateral registry with the note A, there can be read three and a half tones on the tone numbers for the perfect fifth.

The minor seventh ascending of G, as shown in FIG. 5, may be defined (a) by placing the first note G at the zero of the tone numbers or the first degree of the diatonic scale and reading in the line of intervals the number 1 in lateral registry with this note; (b) from the note G counting seven adjoining notes and reading the number 7 in the line of intervals; (c) by reading the note connected to the number 7 by the corresponding line 13 which is color coded and arranged to point to a minor interval; and (d) from the letter F by passing to the tone numbers to read the five tones of a minor seventh.

The diminished fourth descending of D, as shown in FIG. 6, is defined (a) by sliding the chromatic scale to the left to place the note D in lateral registry with the number 4 of the line of intervals through alignment with the corresponding line 14 which points and is color coded to define a diminished interval; (b) from the number 4, by reading toward the left the number 1 in the line of intervals; (c) by reading the note laterally registering with this number 1; the note A sharp. This note is the answer to the diminished fourth descending from D. The span of two tones of this interval is read on the tone numbers in registry with the note D.

What I claim is:

1. A musical scales and intervals teaching device comprising a first member and a second member movably connected one to the other, a chromatic scale having the musical notes equidistantly marked in equidistant tonal relationship on one face of said first member and arranged for endwise displacement relative to said second member, and an intervals indicator marked on one face of said second member laterally adjacent to said chromatic scale and including coded pointers and predetermined points spaced from said chromatic scale with said coded pointers extending from said predetermined points and leading toward the chromatic scale in predetermined spaced-apart relationship to distinctively indicate the qualifications of any simple and composed interval.

2. A musical scales and intervals teaching device as defined in claim 1, further including a diatonic scale having the tones and halftones marked in said equidistant tonal relationship, on said one face of said second member laterally adjacent to said chromatic scale and on opposite side of the latter relative to said intervals indicator.

3. A musical scales and intervals indicator device as defined in claim 2, further including a tetrachords indicator juxtaposed to said diatonic scale, and degrees of an octave registering with the tetrachords and adapted to identify the notes of the octave registering with said tetrachord.

4. A musical scales and intervals indicator device as defined in claim 1, wherein said pointers include a first set of marks coded to distinctively indicate the perfect intervals and leading toward the generator tones of said chromatic scale, a second set of marks coded to distinctively indicate the major intervale and leading toward the harmonic tones of said chromatic scale, a third set of marks coded to distinctively indicate the minor intervals and leading from said second set of marks toward said chromatic scale a half-chromatic and descending interval from said second set of marks respectively, a fourth set of marks coded to distinctively indicate the diminished intervals and leading from said first set of marks toward said chromatic scale a half-chromatic tone and descending interval from said first set of marks respectively, a fifth set of marks coded to distinctively indicate the diminished intervals and leading from all but one mark of said second set of marks a full chromatic tone and descending interval from the corresponding marks of said second set of marks, and a sixth set of marks coded to distinctively indicate the augmented intervals and leading from said first and said second sets of marks toward said chromatic scale a half-chromatic tone and ascending interval from said first and said second sets of marks respectively.

5. A device as defined in claim 4, wherein said points are serially numbered from 1 to 8 and 9 to 15 inclusive to indicate the simple and composed intervals relative to one of said notes registering with the point numbered 1.

6. A device as claimed in claim 4, wherein said second member constitutes a base member having a rectilinear groove therein and said first member constitutes a ruler sliding in said groove.

* * * * *